US012448934B2

(12) United States Patent
Yasuhara

(10) Patent No.: US 12,448,934 B2
(45) Date of Patent: Oct. 21, 2025

(54) CASE MEMBER ATTACHMENT STRUCTURE

(71) Applicant: TOYOTA JIDOSHA KABUSHIKI KAISHA, Toyota (JP)

(72) Inventor: Junichi Yasuhara, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/809,881

(22) Filed: Aug. 20, 2024

(65) Prior Publication Data

US 2025/0172106 A1 May 29, 2025

(30) Foreign Application Priority Data

Nov. 24, 2023 (JP) ................................ 2023-199224

(51) Int. Cl.
*F02F 7/00* (2006.01)
*F01M 11/02* (2006.01)

(52) U.S. Cl.
CPC .......... *F02F 7/0082* (2013.01); *F01M 11/02* (2013.01); *F02F 7/0068* (2013.01)

(58) Field of Classification Search
CPC ...... F02F 7/0082; F02F 7/0068; F02F 7/0073; F02F 2007/0075; F01M 11/02
See application file for complete search history.

(56) References Cited

U.S. PATENT DOCUMENTS

| | | | | |
|---|---|---|---|---|
| 5,718,196 A * | 2/1998 | Uchiyama | F01L 1/265 | 123/196 R |
| 2002/0046727 A1 | 4/2002 | Kobayashi et al. | | |
| 2002/0056426 A1* | 5/2002 | Kobayashi | F01L 1/3442 | 123/90.15 |
| 2010/0248564 A1* | 9/2010 | Okabe | B63H 20/002 | 440/75 |
| 2015/0096525 A1* | 4/2015 | Reinhart | F02F 7/0073 | 123/195 C |

FOREIGN PATENT DOCUMENTS

| | | | |
|---|---|---|---|
| EP | 2857665 A1 * | 4/2015 | F02F 7/0073 |
| JP | 2002-130051 A | 5/2002 | |

* cited by examiner

*Primary Examiner* — Syed O Hasan
(74) *Attorney, Agent, or Firm* — SoraIP, Inc.

(57) ABSTRACT

A case member attachment structure, comprising: a first case member, a second case member attached to a first surface of the first case member; and a third case member attached to a second surface, which is a surface opposite to the first surface of the first case member, wherein the first case member and the third case member are fastened by a fastening member, and wherein in an extending direction of the first surface, a position at which the second surface and the fastening member are attached is located inside the first surface.

1 Claim, 3 Drawing Sheets

CASE MEMBER ATTACHMENT STRUCTURE

CROSS-REFERENCE TO RELATED APPLICATION

This application claims priority to Japanese Patent Application No. 2023-199224 filed on Nov. 24, 2023, incorporated herein by reference in its entirety.

BACKGROUND

1. Technical Field

The present disclosure relates to a case member attachment structure.

2. Description of Related Art

A case member such as a chain case of an internal combustion engine is attached to a crankcase with bolts (for example, Japanese Unexamined Patent Application Publication No. 2002-130051 (JP 2002-130051 A)).

SUMMARY

Attaching a plurality of case members may cause an increase in the size of the attachment structure. Therefore, an object of the present disclosure is to provide a case member attachment structure in which an increase in its size can be suppressed.

The above object can be achieved by a case member attachment structure.

The case member attachment structure includes:

- a first case member;
- a second case member attached to a first surface of the first case member; and
- a third case member attached to a second surface of the first case member that is opposite to the first surface.

The first case member and the third case member are fastened by a fastening member.

The second surface and a position where the fastening member is attached are located on an inner side with respect to the first surface in an extending direction of the first surface.

The first case member may include a first oil passage.

The second case member may include a second oil passage.

The third case member may include a third oil passage.

The first oil passage, the second oil passage, and the third oil passage may constitute a single oil passage.

The fastening member may be a bolt.

A first portion of the first case member may surround a head of the bolt.

The head and the first portion of the first case member may be located outside a main flow in the first oil passage.

A second portion may be located on one side of the bolt on an inner wall of the first case member.

A third portion may be located on a side of the bolt that is opposite to the second portion on the inner wall.

An inner side of a line connecting the second portion and the third portion may be the main flow in the first oil passage.

An oil filter may be provided upstream of the oil passage.

The fastening member may be located downstream of the oil filter.

It is possible to provide the case member attachment structure in which the increase in its size can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
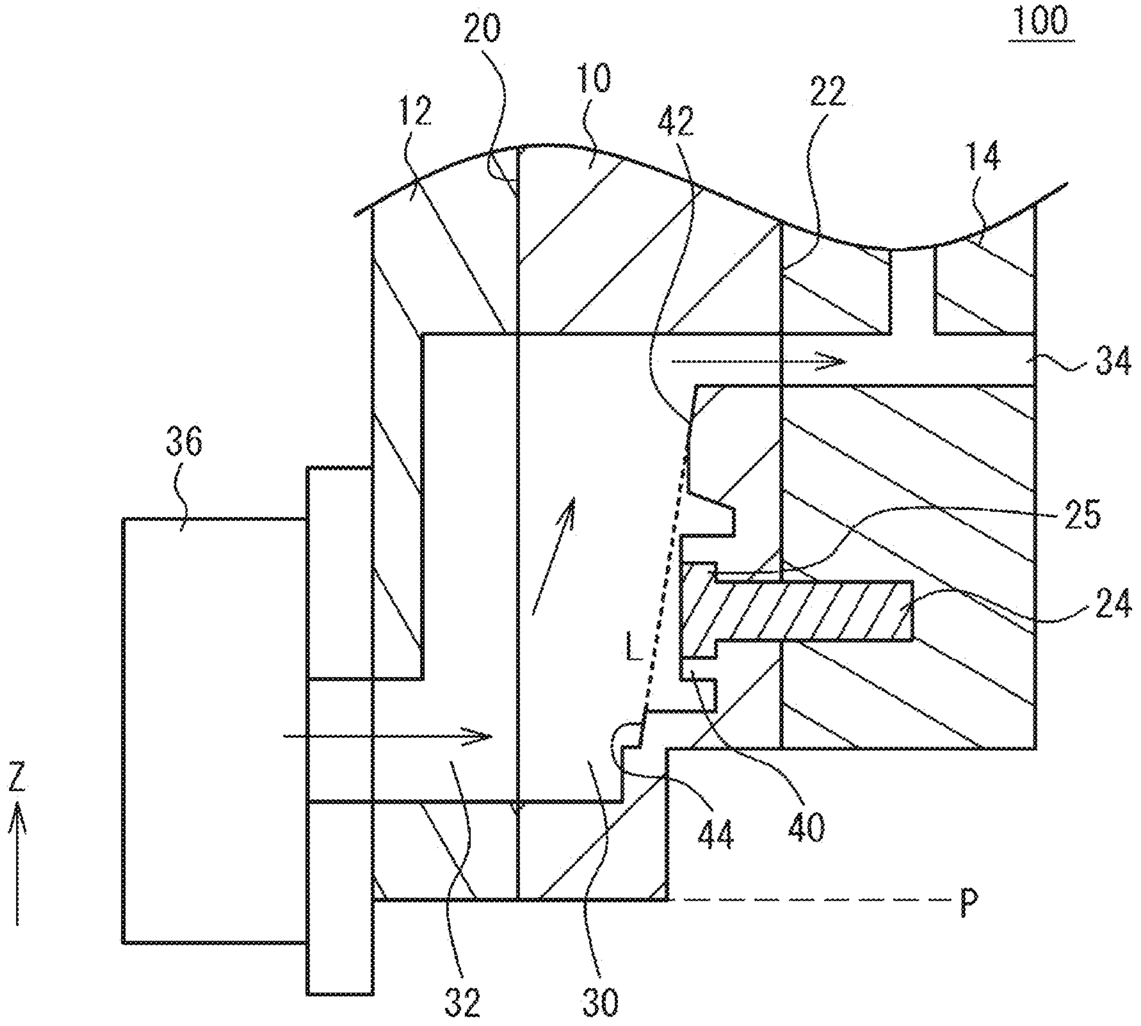
FIG. 1 is a schematic view illustrating a case member attachment structure according to an embodiment.

Hereinafter, the case member attachment structure of the present embodiment will be described with reference to the drawings. However, in the drawings, the dimensions, ratios, and the like of the respective parts may not be shown so as to completely coincide with the actual ones. Further, in some drawings, details are omitted.

FIG. 1 is a schematic diagram illustrating a case member attachment structure 100 according to an embodiment. The attachment structure 100 includes a case member 10 (first case member), a case member 12 (second case member), and a case member 14 (third case member). The case member 10 and the case member 12 are chain cases, and a chain (not shown) is housed therein. The case member 14 is a crankcase of an internal combustion engine.

The case member 12 is attached to one surface (first surface) of the case member 10. The case member 14 is attached to a surface (second surface) of the case member 10 opposite to the surface to which the case member 12 is attached. A joining surface between the case member 10 and the case member 12 is referred to as a surface 20. A joining surface between the case member 10 and the case member 14 is referred to as a surface 22.

The case member 12 is fixed to the case member 10 by a bolt or the like (not shown). The case member 14 is fixed to the case member 10 by a bolt 24 (fastening member) or the like. The bolt 24 passes through the surface 22 and extends from the case member 10 to the case member 14.

The Z-axis direction is parallel to the surface 20 and the surface 22 and is the direction of extension of these surfaces. The position of the end portion of the surface 20 in the Z-axis direction is P, and is indicated by a broken line in FIG. 1. In the Z-axis direction, the end portion of the surface 22 and the bolt 24 are located inside the position P. That is, the position where the surface 22 and the bolt 24 are attached is located inside the surface 20 in the Z-axis direction.

The bolt 24 is inserted into the case member 10 and the case member 14. The bolt 24 protrudes from the head 25 in the direction of the case member 14. The head 25 of the bolt 24 is exposed to the oil passage 30. A portion 40 (first portion) of the case member 10 surrounds a side surface of the head 25.

An oil passage 30 (first oil passage) is provided inside the case member 10. An oil passage 32 (second oil passage) is provided inside the case member 12. An oil passage 34 (third oil passage) is provided inside the case member 14. The oil passage 30 and the oil passage 32 communicate with each other. The oil passage 30 and the oil passage 34 communicate with each other. The oil passage 30, the oil passage 32, and the oil passage 34 form one oil passage.

An oil filter 36 is attached to the case member 12. The oil filter 36 is located upstream of the oil passage, and removes foreign matters in the oil. As indicated by arrows in FIG. 1, the oil filtered by the oil filter 36 flows through the oil passage 32, the oil passage 30, and the oil passage 34 in this order, and is supplied to an internal combustion engine or the like.

The oil passage 32 is defined by an inner wall of the case member 12. The oil passage 34 is defined by an inner wall of the case member 14. The oil passage 30 is defined by an inner wall of the case member 10. A portion 42 (second portion) of the inner wall of the case member 10. It is located on one side of the head 25 of the bolt 24. A portion 44 (third portion) of the inner wall is located opposite the portion 42 of the head 25. The dotted line L in FIG. 1 is an imaginary line connecting the portion 42 and the portion 44.

Figure 2:
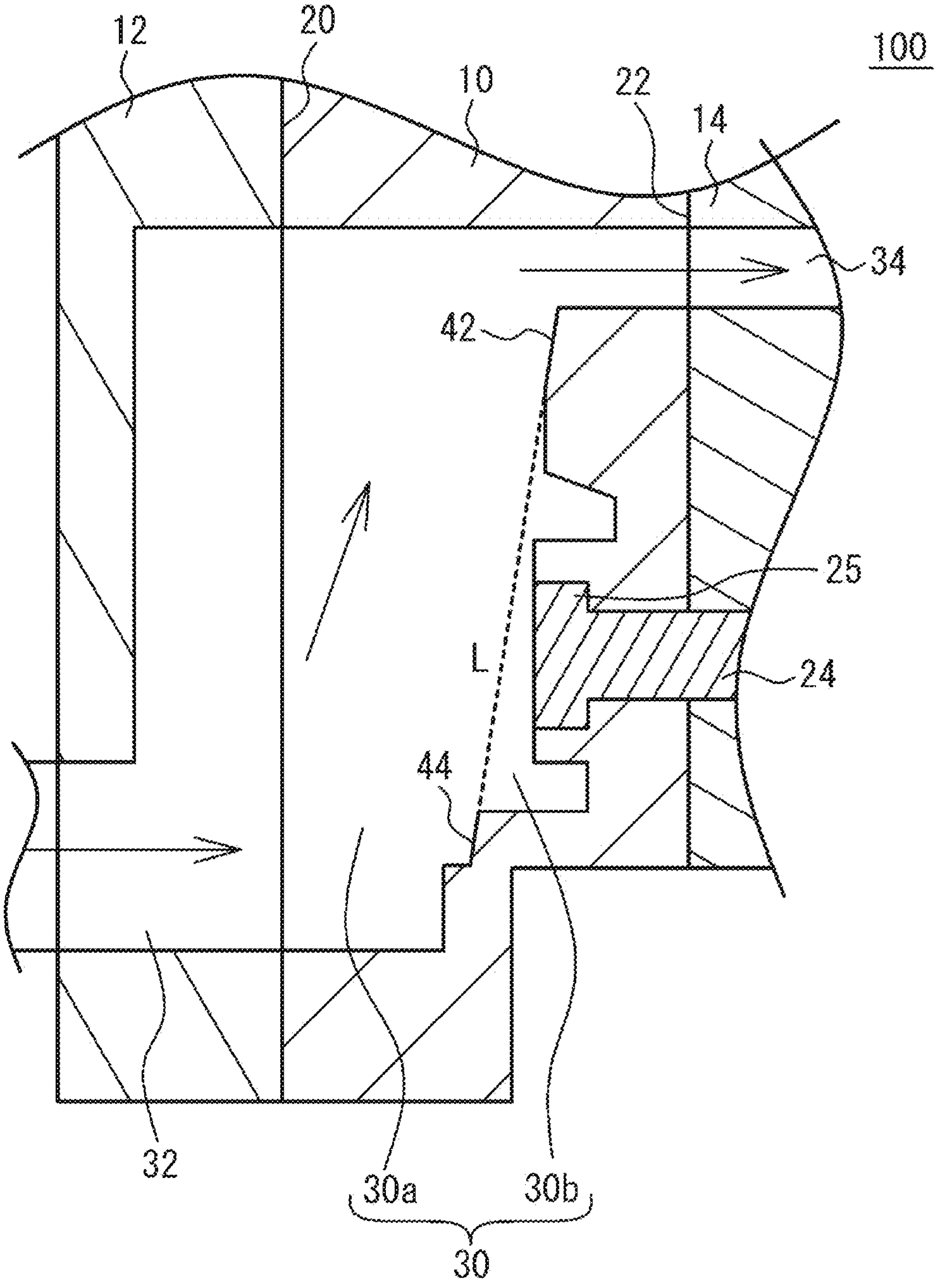
FIG. 2 is an enlarged view of an oil channel.

FIG. 2 is an enlarged view of an oil passage. The oil passage 30 has a partial 30*a* and a partial 30*b*. The partial 30*a* is located inside the dotted line L connecting the portion 42 and the portion 44 of the inner wall, and is the main flow of the oil passage 30. The partial 30*b* is located outward from the dotted line L and is closer to the inner wall than the partial 30*a*. The oil flows more in the partial 30*a* than in the partial 30*b*.

The head 25 of the bolt 24 and the portion 40 of the case member 10 are positioned closer to the case member 14 than the dotted line L. That is, the head 25 and the portion 40 are disposed outside the partial 30*a* which is the main flow of the oil passage 30, and are located in the partial 30*b*.

Figure 3:
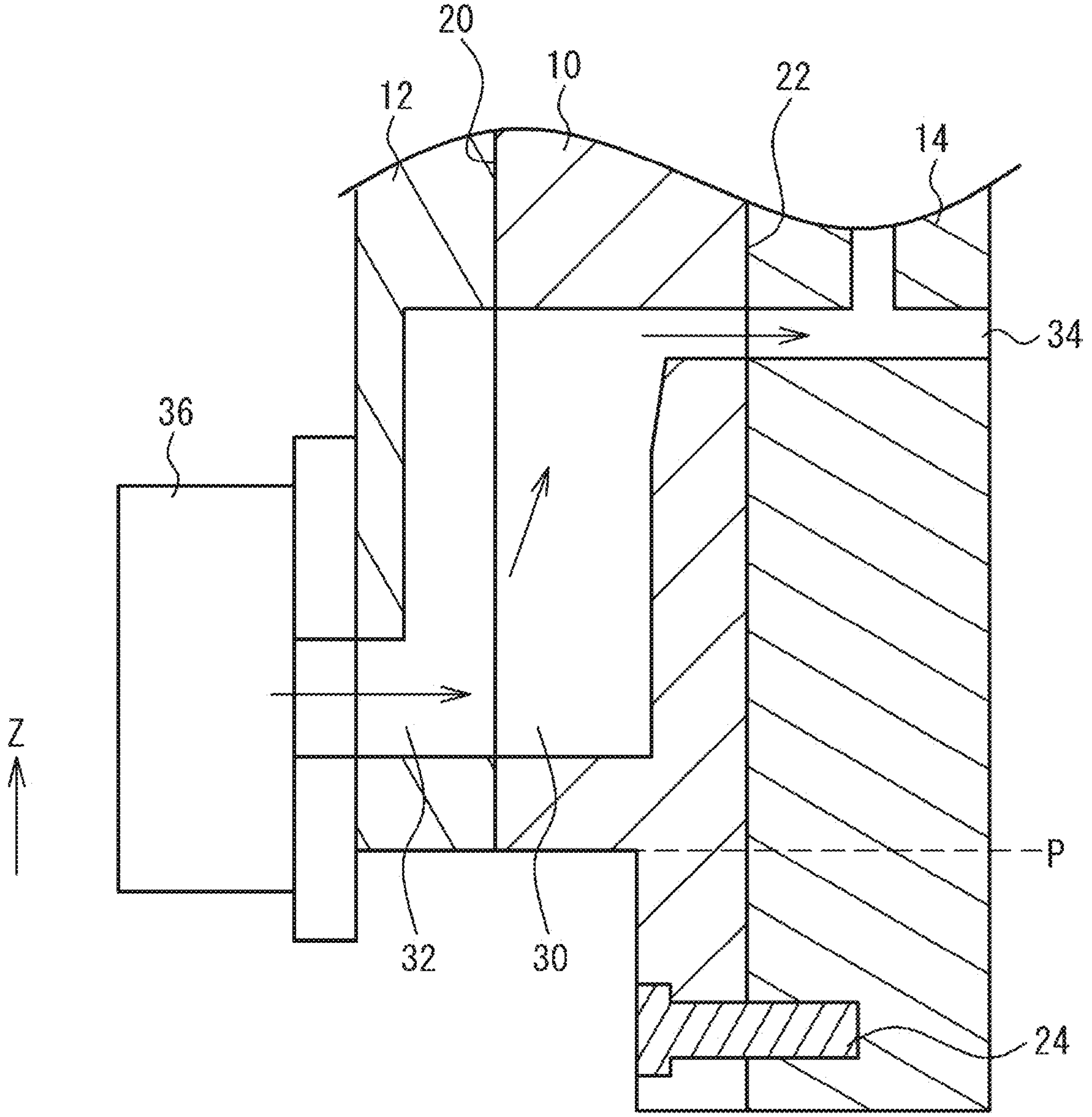
FIG. 3 is a cross-sectional view illustrating a case member attachment structure according to a comparative example.

FIG. 3 is a cross-sectional view illustrating a case member attachment structure according to a comparative example. In the Z-axis direction, the end portion of the surface 22 and the bolt 24 are located outside the position P. The case members 10 and 14 project out of the case member 12. The size of the attachment structure is increased.

According to the embodiment, the surface 22 and the position to which the bolt 24 is attached are located inside the surface 20 in the Z-axis direction. The case members 10 and 14 fit inside the case member 12. Compared with the case where the fastening positions of the surface 22 and the bolt 24 are located outside the surface 20, the size increase of the attachment structure 100 is suppressed and the size thereof is reduced.

The oil flows through the oil passage 32, the oil passage 30, and the oil passage 34 in this order. The oil is more likely to flow in the central portion of the oil passage than in the portion close to the inner wall. The partial 30*a* of the oil passage 30 is the main flow, and more oil flows in the partial 30*a* than in the partial 30*b*.

The head 25 of the bolt 24 and the portion 40 of the case member 10 are disposed closer to the case member 14 than the dotted line L connecting the portion 42 and the portion 44. That is, the head 25 and the portion 40 are disposed outside the partial 30*a* of the oil passage 30 and are located in the partial 30*b*. Since the bolt 24 does not protrude to the partial 30*a* of the oil passage 30, it is difficult to collide with the oil. Resistance to oil is unlikely to increase, and a decrease in oil pressure is suppressed.

The bolt 24 is provided downstream of the oil filter 36. The case member 10 and the case member 14 are attached by the bolt 24. The oil filtered by the oil filter 36 flows through the portion fixed by the bolt 24. Oil leakage is suppressed. The deterioration of the cleaning performance by the oil is suppressed.

The case member is not limited to a chain case and a crankcase. Embodiments may be applied to a structure in which a separate case member is attached to both sides of one case member.

Although the preferred embodiment of the disclosure is described above in detail, the disclosure is not limited to the specific embodiment, and various modifications and changes may be made within the scope of the disclosure described in claims.

What is claimed is:

1. A case member attachment structure comprising:

a first case member;

a second case member attached to a first surface of the first case member;

a third case member attached to a second surface of the first case member that is opposite to the first surface;

a bolt; and an oil filter, wherein the first case member and the third case member are fastened by the bolt, the second surface and a position where the bolt is attached are located on an inner side with respect to the first surface in an extending direction of the first surface, the first case member includes a first oil passage, the second case member includes a second oil passage, the third case member includes a third oil passage, the first oil passage, the second oil passage, and the third oil passage constitute a single oil passage, a first portion of the first case member surrounds a head of the bolt, the head and the first portion of the first case member being disposed within the first oil passage outside a main flow of oil in the first oil passage to avoid interfering with the main flow, the oil filter is provided upstream of the single oil passage, the bolt is located downstream of the oil filter, and the first case member is a first chain case and the second case member is a second chain case, and the third case member is a crankcase of an internal combustion engine.

* * * * *